United States Patent [19]

Kaiser et al.

[11] 4,378,129
[45] Mar. 29, 1983

[54] SUN VISOR WITH PROTECTED MIRROR PARTICULARLY FOR VEHICLES

[75] Inventors: Klaus-Peter Kaiser, Wermelskirchen; Lothar Viertel, Saarlouis, both of Fed. Rep. of Germany

[73] Assignee: Gebr. Happich GmbH, Fed. Rep. of Germany

[21] Appl. No.: 226,681

[22] Filed: Jan. 21, 1981

[30] Foreign Application Priority Data

Mar. 4, 1980 [DE] Fed. Rep. of Germany ....... 3008175

[51] Int. Cl.³ .............................................. B60J 3/02
[52] U.S. Cl. .............................................. 296/97 H
[58] Field of Search ................ 296/97 R, 97 C, 97 H; 350/65

[56] References Cited

U.S. PATENT DOCUMENTS

| 3,926,470 | 12/1975 | Marcus | 296/97 H |
| 4,068,930 | 1/1978 | Marcus | 296/97 R |
| 4,174,864 | 11/1979 | Viertel et al. | 296/97 H |
| 4,203,149 | 5/1980 | Viertel et al. | 296/97 H |
| 4,275,916 | 6/1981 | Skogler | 296/97 H |

Primary Examiner—Richard A. Bertsch
Attorney, Agent, or Firm—Ostrolenk, Faber, Gerb & Soffen

[57] ABSTRACT

The invention concerns a sun visor for an automotive vehicle, or the like, which is adapted to safety requirements. The visor body has a frame that is flush with the outer surface of the sun visor body. The sun visor has a mirror in the visor body that is protected by a cover. The cover is swivelably mounted to the visor body frame to swivel between its open and closed conditions. A separately swivelable control knob selectively locks closed and permits opening of the cover. The control knob has a recess for capturing the free edge of the cover and swiveling of the control knob with the edge of the cover in the recess locks the cover closed. A detent locks the knob in the open condition. The cover is an integral unit including a pin that is received in a hole in the frame for supporting the cover, the swiveling cover itself and a hinge between the attached and swiveling portions of the cover.

19 Claims, 4 Drawing Figures

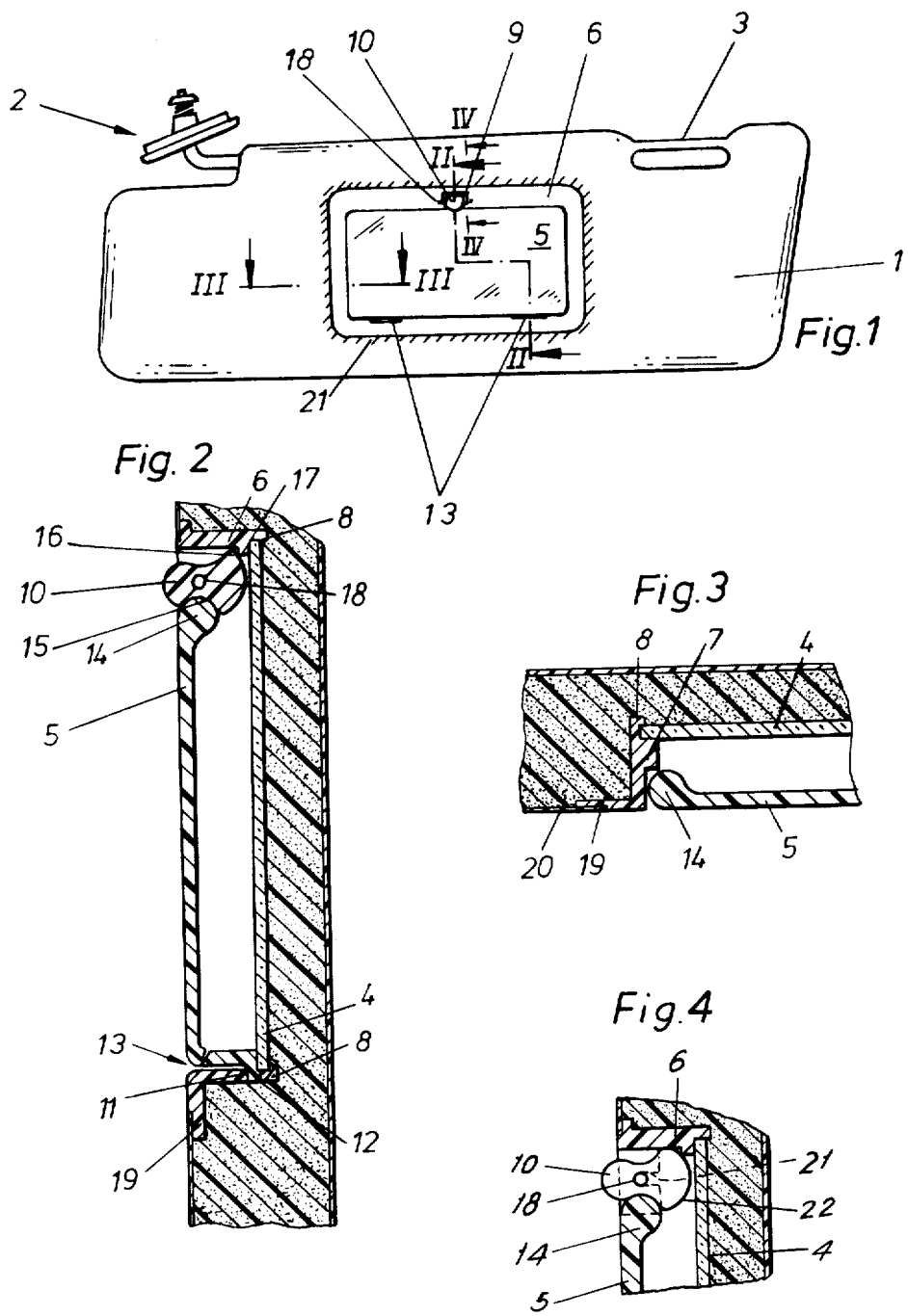

SUN VISOR WITH PROTECTED MIRROR PARTICULARLY FOR VEHICLES

BACKGROUND OF THE INVENTION

The invention relates to a sun visor for an automotive vehicle, or the like, and particularly to a sun visor having a mirror therein.

Sun visors for vehicles have been equipped with mirrors, which frequently are illuminated by a light source. The mirror is generally inserted in a mirror frame and the frame is so mounted in the sun visor body that the mirror can be viewed when the sun visor is swiveled down. Particularly for safety reasons, the mirrors must have a protective cover.

U.S. Pat. No. 4,174,864 discloses a sun visor wherein a frame holding a mirror and a protective cover is mounted in the sun visor body. But, the frame projects from the plane of the visor body and defines hard edges which may violate safety regulations. The protective cover connected with the frame is hingedly mounted on the upper edge of the frame and the cover can only be turned by about 90°. In the open position, the free front edge of the protective cover therefore protrudes into the passenger compartment. Especially during emergency braking or in an accident, this can have a piercing effect and injure a passenger in the vehicle. Besides, the protective cover is impractical to open in the known sun visors.

In another known sun visor with a mirror and a protective cover, disclosed in German Utility Model (Gebrauchsmuster) 75 33 246, the protective cover can be turned by about 180° on its frame, avoiding the risk of injuring the passenger in the vehicle. But, in this known sun visor too, the frame, just like the protective cover, projects from the plane of the sun visor body. The protective cover is relatively impractical to handle, and particularly it is difficult to open.

Also see U.S. Pat. No. 3,751,106.

SUMMARY OF THE INVENTION

The object of the invention is to simplify a sun visor of the above-described type to improve it with regard to satisfying safety requirements and to facilitate handling of the protective cover over the mirror.

Another object of the invention is to eliminate projection of the cover, the supporting frame for the cover and/or the mirror beyond the surface of the sun visor body, for satisfying safety requirements.

Another object of the invention is to effectively lock and unlock the cover from its mirror protecting or exposing positions.

According to the invention, the protective cover over the mirror is attached to the frame surrounding and perhaps supporting the mirror in the sun visor body. The cover may be moved or swiveled between the position where it is closed to block visual access to the mirror and is opened permitting viewing of the mirror.

A control knob supported on the frame locks the cover in closed position and is movable to free the cover to open.

The mirror-carrying frame and the protective cover lie in the plane of the surface of the sun visor body, eliminating projecting edges which could represent a hazard.

The invention also facilitates handling of the protective cover since the cover can be opened by operating a knob, which also avoids the risk of an operator damaging the fingernails. The control knob may be countersunk in a recess of the frame so that the knob does not represent a hazard for the user of the vehicle.

Like the cover, the knob also is swivelable between its two positions. The knob is located at the edge of the cover that is away from the swivel axis of the cover. The swivel axis of the knob generally parallels the swivel axis of the cover. For supporting the frame in the closed position, the control knob has a recess that is placed for overlapping the free edge of the cover for capturing the cover in the closed position when the knob is appropriately oriented. The swivel axis of the knob, the swivel axis of the cover and the recess of the knob are all respectively so placed that the recess and the free edge of the cover therein can be swiveled over the dead center line joining the two swivel axes of the knob and of the cover. By turning the control knob, which can be done with the ball of the finger, the protective cover is unlocked, guided over a dead center position and can then be turned into the completely open position, that is if the cover does not already perform this swivel movement automatically by its own weight.

A detent on the control knob cooperates with the frame and holds the knob in the standby, open position, so that both unlocking and locking of the protective cover can be effected with one hand.

The knob is swivelably supported to the frame by bearing pins located at the sides of the knob. Recesses are defined in the frame for rotatably receiving the bearing pins. These bearing pin recesses open rearwardly toward the mirror, which is located behind the bearing pins, and the mirror will be contacted by the inwardly facing side of the control knob, whereby the mirror will provide part of the support for the bearing pins in the recesses. By means of the foregoing, the control knob can be mounted very simply merely by just inserting it in the bearing pin recesses.

The cover is attached to the frame. Such attachment can be by means of a pin attached to the cover which projects into a hole provided therefor in the frame. A hinge is defined in the cover between its attachment and the cover itself and the cover is swiveled between its positions at the hinge. The cover and its attachments are integral and the hinge is an integral connection therebetween.

The frame includes an outer flange around it, and facing outwardly of the outer flange, flat recess is defined. The sun visor body is surrounded by a covering foil and the recess in the outer flange is of a depth to receive the foil, giving the exterior of the visor body a smooth appearance. This arrangement of the foil surrounding the sun visor body on the frame flange, for example, as a fastening means appears as a decorative seam.

The frame includes a recessed flange at least in the vicinity of the control knob so that the cover may bear against one side of the recessed flange. That same flange is shaped and positioned so that the mirror bears against the opposite side of the recessed flange. In addition, appropriate clip means are provided in the frame for holding the mirror to the frame. This permits mounting of both the mirror and the protective cover by insertion or clamping and reliably supports them on the frame.

Other objects and features of the invention will be described below with reference to an embodiment of the invention shown in the accompanying drawings.

BRIEF DESCRIPTION OF THE DRAWINGS

FIG. 1 is an elevational view of a sun visor body.

FIG. 2 shows a section II—II according to FIG. 1 on an enlarged scale.

FIG. 3 shows a section III—III according to FIG. 1, on an enlarged scale.

FIG. 4 shows a section IV—IV according to FIG. 1.

DETAILED DESCRIPTION OF THE PREFERRED EMBODIMENT

FIG. 1 shows a sun visor having a sun visor body 1 that is equipped at the upper edge with a pivot bearing 2. It also includes an axle 3 for a tilting or opposed bearing. See U.S. Pat. No. 4,174,864. One side surface of the sun visor body 1 carries a frame 6 that is equipped with a mirror 4 and a protecting cover 5. The fastening of frame 6 inside a recess of the sun visor body 1 is effected in a known manner.

Frame 6 includes a circumferential flange 7 on its inside. A mirror 4 bears against one side of the frame 6 and a protective cover 5 bears against the other side of the frame 6. Mirror 4 is fixed in place at its edges by clips 8 which are molded on frame 6 and are preferably made of plastic. In its upper frame region, flange 7 has a centrally arranged recess 9 in which a control knob 10 is rotatably mounted. In the bottom frame region, flange 7 has two holes 11 in its side. These are engaged by pins 12 which are integral with the protective cover 5. The pins 12 are joined to the cover 5 over a flat hinge 13. The cover 5 and the pins 12 are preferably made of plastic. Holes 11 are so arranged that pins 12 are supported by mirror 4. Hooks which are molded on pins 12 extend under the mirror edge, as can be seen particularly from FIG. 2.

Along its lateral or side edges and its upper longitudinal edge, protective cover 5 has a thickened bead 14 which is so shaped, dimensioned and oriented that the outer surface of protective cover 5 is flush with the outer surface of the frame, when bead 14 bears on flange 7 of frame 6 in the closed terminal position of the protective cover 5.

FIG. 2 shows that control knob 10 is shaped to have a groove-type curved recess 15 on its underside which receives bead 14 at the upper edge of protective cover 5. In connection with the rotatable support of control knob 10, this recess 15 permits locking and unlocking of protective cover 5. Bead 14 engages in recess 15 during closing movement of the cover 5 and they move together during further closing movement into the closed terminal position, over the dead center position defined by the imaginary connecting line of the joints of protective cover 5. For unlocking protective cover 5, control knob 10 is raised, i.e. it is turned clockwise in FIG. 2, and protective cover 5 is thus turned out, in the opposite direction from the knob, so that the cover can be opened completely as soon as it is disengaged from control knob 10.

On the upper side, control knob 10 has a molded-on detent 16 which serves to hold control knob 10 in the unlocked, standby position, at which detent 16 extends behind the edge 17 of flange 7 facing toward mirror 4 and protective cover 5 in closed position, too. When cover 5 is swiveled closed, it engages the recess 15 and swivels the knob 10 over the dead center position, whereby an additional locking safety is provided.

Control knob 10 has laterally molded-on, bearing pins 18. For receiving bearing pins 18, frame 6 has elongated recesses 21, which widen recess 9. These frame recesses also open rearwardly toward mirror 4. This ensures rapid insertion of bearing pins 18. Further the inward side 21 of the knob is shaped to contact the mirror in its frame for clamping control knob 10 in position and thereby enabling easy locking of protective cover 5 over mirror 4.

Frame 6 includes an outer circumferential flange 19 which is recessed to a depth corresponding to the thickness of foil 20 surrounding sun visor body 1. Foil 20 is welded to circumferential flange 19 and in the recess of the flange 19 producing the effect of a decorative seam where the edge of the foil meets the edge of the recess in flange 19.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A sun visor for automotive vehicles, or the like, comprising:

a sun visor body; the body having an outer surface at one side thereof; a frame in the body for supporting a mirror and a mirror supported in the frame to be visible upon looking toward the outer surface of the visor body at one side thereof; the frame being substantially flush with the outer surface at the one side of the visor body; a first recess in the frame which opens outwardly of the outer surface at the one side of the sun visor body;

a protective cover for covering over the mirror, the cover being swivelably attached to the frame at a swivel axis and the cover being swivelable between a covering position, where the cover covers over the mirror, and an open position, where the cover exposes the mirror to view; in the covering position, the cover being substantially flush with the outer surface of the body;

a control knob positioned to engage the cover at the side of the cover away from the swivel axis of the cover for locking the mirror into the covering position and the control knob being movable for permitting the cover to be swiveled to the open position thereof; the knob is swivelably supported on the frame to swivel between the positions where it locks the cover in the closed position and where it frees the cover to swivel out of the closed position.

2. The sun visor of claim 1, wherein the frame includes an inner, recessed flange in the vicinity of the control knob and placed for the cover to bear against one side of the inner, recessed flange and for the mirror to bear against the opposite side of the inner recessed flange;

clip means on the frame for holding the mirror thereto.

3. The sun visor of either of claims 1 or 2, further comprising a first recess in the frame which opens outwardly of the outer surface at the one side of the visor body; the control knob being generally countersunk in the first recess, thereby minimizing protrusion of the knob from the outer surface.

4. The sun visor of claim 1, wherein the axis of swivel of the knob is generally parallel to the swivel axis of the cover.

5. The sun visor of either of claims 1 or 4, wherein the control knob has a recess therein placed for overlapping the free edge of the cover for capturing the cover in the closed position thereof.

6. The sun visor of claim 5, wherein the axis of swivel of the knob, the swivel axis of the cover and the recess in the knob are all so placed that the recess in the knob and the free edge of the cover therein can be swiveled over center over the line joining the two swivel axes.

7. The sun visor of claim 6, wherein the swivel support of the knob comprises bearing pins at the sides of the knob and comprises recesses in the frame for rotatably receiving the bearing pins of the knob.

8. The sun visor of claim 5, further comprising detent means on the knob and on the frame for holding the knob in its cover unlocked position.

9. The sun visor of claim 1, further comprising detent means on the knob and on the frame for holding the knob in the cover unlocked position thereof.

10. The sun visor of claim 9, wherein the detent means comprise a detent on that side of the knob that is away from the knob recess and comprises an edge defined on the frame for being engaged by the detent on the knob.

11. The sun visor of claim 1, wherein the swivel support of the knob comprises bearing pins at the sides of the knob and comprises recesses in the frame for rotatably receiving the bearing pins of the knob.

12. The sun visor of claim 11, wherein the bearing pin recesses in the frame open toward the mirror, which is located behind the bearing pins.

13. The sun visor of claim 1, wherein the cover is attached to the frame and the cover includes a hinge between the swivelable portion of the cover and the attachment of the cover to the frame, at which hinge the swivel axis is located so that the cover swivels between its closed and open positions.

14. The sun visor of claim 13, wherein the cover including the hinge thereof is integral.

15. The sun visor of either of claims 13 or 14, wherein the attachment of the cover to the frame comprises a pin connected with the cover and comprises a hole defined in the frame for receiving the pin.

16. The sun visor of claim 1, wherein the control knob has a recess therein placed for overlapping the free edge of the cover for capturing the cover in the closed position thereof.

17. The sun visor of claim 16, further comprising detent means on the knob and on the frame for holding the knob in the cover unlocked position thereof.

18. A sun visor for automotive vehicles, or the like, comprising;
a sun visor body; the body having an outer surface at one side thereof; a frame in the body for supporting a mirror and a mirror supported in the frame to be visible upon looking toward the outer surface of the visor body at one side thereof; the frame being substantially flush with the outer surface at the one side of the visor body;
a protective cover for covering over the mirror, the cover being swivelably attached to the frame and the cover being swivelable between a covering position, where the cover covers over the mirror, and an open position, where the cover exposes the mirror to view; in the covering position, the cover being substantially flush with the outer surface of the body; the cover includes a swivel hinge between the cover and the frame; at the hinge, the cover swivels between its closed and open positions;
a control knob for locking the mirror into the covering position and the control knob being movable for permitting the cover to swivel to the open position thereof; the frame includes an inner recessed flange in the vicinity of the control knob and placed for the cover to bear against one side of the inner recessed flange and for the mirror to bear against the opposite side of the inner recessed flange;
clip means on the frame for holding the mirror thereto.

19. A sun visor for automotive vehicles, or the like, comprising;
a sun visor body; the body having an outer surface at one side thereof; a frame in the body for supporting a mirror and a mirror supported in the frame to be visible upon looking toward the outer surface of the visor body at one side thereof; the frame being substantially flush with the outer surface at the one side of the visor body;
a protective cover supported on the body for covering over the mirror, and the cover being movable between a covering position, where the cover covers over the mirror, and an open position, where the cover exposes the mirror to view; in the covering position, the cover being substantially flush with the outer surface of the body;
a control knob for locking the mirror into the covering position and the control knob being movable for permitting the cover to be moved to the open position thereof; the frame includes an inner, recessed flange in the vicinity of the control knob and placed for the cover to bear against one side of the inner, recessed flange and for the mirror to bear against the opposite side of the inner, recessed flange;
clip means on the frame for holding the mirror thereto.

* * * * *